(No Model.)

P. ULLRICH.
CABINET.

No. 544,138. Patented Aug. 6, 1895.

WITNESSES:

INVENTOR
P. Ullrich
BY
Munn & Co.
ATTORNEYS.

UNITED STATES PATENT OFFICE.

PETER ULLRICH, OF CEDAR RAPIDS, IOWA.

CABINET.

SPECIFICATION forming part of Letters Patent No. 544,138, dated August 6, 1895.

Application filed March 4, 1895. Serial No. 540,437. (No model.)

*To all whom it may concern:*

Be it known that I, PETER ULLRICH, of Cedar Rapids, in the county of Linn and State of Iowa, have invented a new and Improved Cabinet, of which the following is a full, clear, and exact description.

This invention relates to certain improvements in cabinets, and has for its object to provide a cabinet of a simple and inexpensive construction adapted especially for use in offices to receive and hold checks, tickets, and other similar articles.

The invention consists in a cabinet adapted to receive the checks, tickets, &c., and having a roll-front adapted to close the open side of the cabinet and arranged to move in grooves, in combination with a brake device adapted to engage said roll-front and hold the same securely against movement in whatever position the said roll-front may stand.

The invention will be hereinafter fully set forth and its novel features carefully defined in the claims.

Reference is to be had to the accompanying drawings, forming a part of this specification, in which similar figures and letters of reference indicate corresponding parts in all the views.

Figure 1:
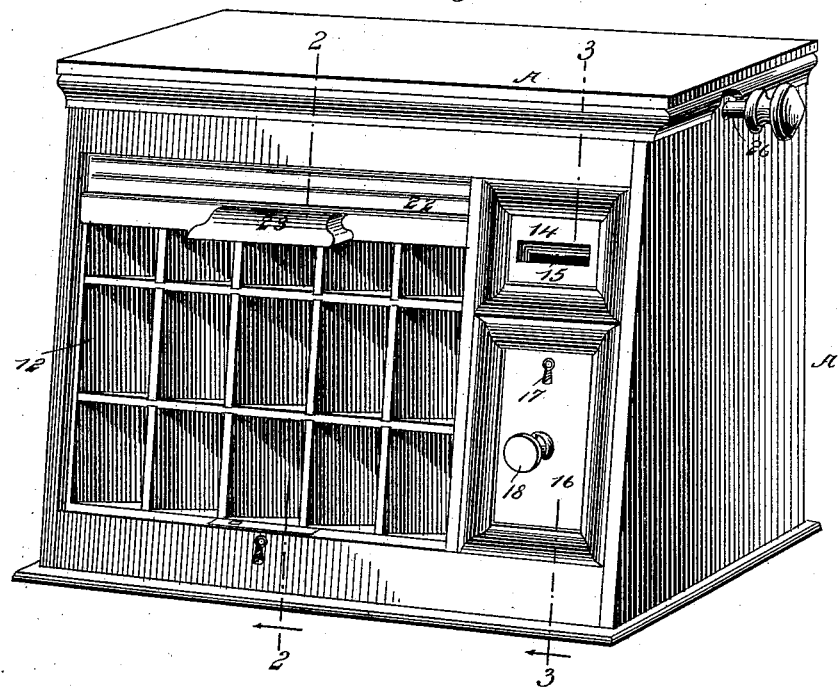
Figure 2:
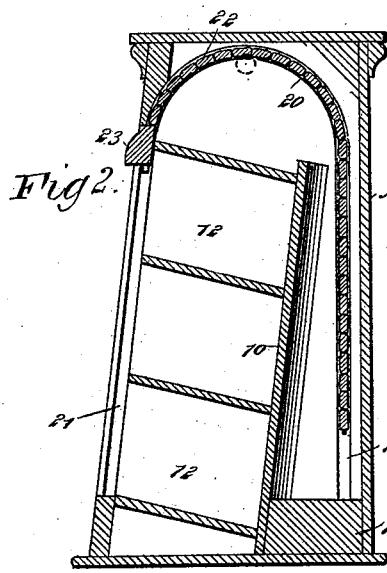
Figure 3:
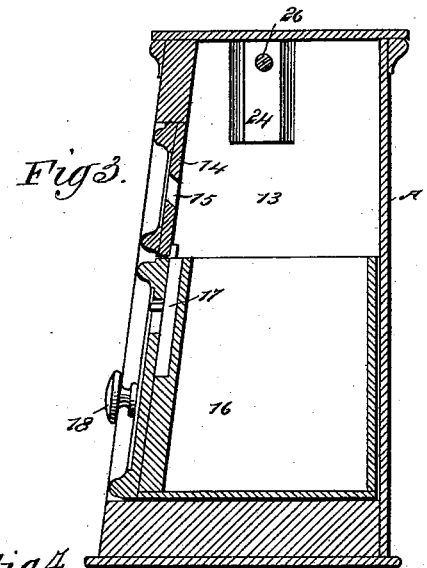
Figure 4:
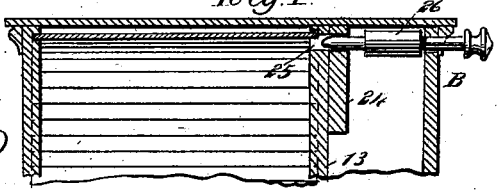

Figure 1 is a perspective view of the cabinet viewed from the front. Fig. 2 is a vertical section on the line 2 2 of Fig. 1. Fig. 3 is a similar section on the line 3 3 of Fig. 1; and Fig. 4 is a longitudinal section through the central portion of the cabinet, illustrating the brake.

In carrying out the invention the casing A of the cabinet may be of any desired shape and either plain or ornamented, but preferably the front portion of the casing is made to bear downward and outward from the top, whereby the base of the casing will be wider than the top. Within the casing an upwardly and rearwardly inclined longitudinal partition 10 is secured, as shown in Fig. 2. This partition extends from the bottom, being attached to a block 11 at that point, or to the equivalent of a block, and terminates between the center of the casing and the top, and the partition forms the rear wall of and likewise a support for a number of pigeon-holes or compartments 12, adapted to receive the checks, tickets, or other material to be dispensed.

The longitudinal partition 10 does not extend from side to side of the cabinet, but is stopped short of one end, being made to abut against a vertical transverse partition 13, which is carried from the bottom to the top of the casing, or practically so, and the compartment formed by the transverse partition and the opposing side of the casing is closed at the upper portion of the front by a panel 14, in which a slot 15 is produced, through which the tickets or checks may be passed, and in the bottom of the said space and below the panel 14 a drawer 16 is placed within the casing, said drawer being adapted to receive the checks, tickets, &c., passed into the cabinet through the opening 15. The drawer 16, which is adapted to be withdrawn entirely from the cabinet when desirable, is provided with a suitable lock 17, preferably operated by a key and a knob or handle 18, as shown in Figs. 1 and 3.

The longitudinal partition 10 supporting the pigeon-holes 12 is removed a predetermined distance from the back of the cabinet, and in the inner face of the transverse partition 13 and the corresponding face of the side of the cabinet farthest removed from the partition a vertical groove 19 is made, which connects at the top with a semicircular groove 20, and each semicircular groove is connected at its forward end with a vertical groove 21 made in the aforesaid partition 13 and the aforesaid side of the cabinet close to the front. What is usually denominated a "roll-front" 22 is held to travel in these grooves, the ends of the front being introduced therein, and the said front being composed of a series of slats horizontally arranged and having flexible connection, the lower slat being attached to the bottom rail 23, which will limit the upward movement of the front. This roll-front, when its lower end is drawn downward to the bottom front portion of the cabinet, will completely conceal the pigeon-holes 12 and will close the front of the cabinet. A suitable lock is provided for this roll top or front at the bottom of the cabinet, and in order that the said front when raised a predetermined distance may be held at that point or at any predetermined point a brake B is employed, which is held to slide in a block 24 or bracket secured to the outer face of the upper portion of the transverse partition 13, as shown in Fig. 4; and this brake likewise has sliding movement in the side of the cabinet adjacent to this partition.

An opening 25 is made in the partition 13, meeting the crown of one semicircular groove 20, and the said brake when pushed inward will enter this opening and jam against the under surface of the upper portion of the roll-front, thus preventing the said front from being moved upward or downward at that time, and the inward and outward movement of the brake is limited by an enlargement 26 located thereon between the supports in which it has movement, as is likewise shown in Fig. 4.

Having thus described my invention, I claim as new and desire to secure by Letters Patent—

1. A cabinet, the same consisting of a casing provided with grooves therein, a roll front or top having movement in the said grooves, the upper portion of the grooves being semi-circular, and a bolt-brake having sliding movement in the casing, one end of the bolt-brake being adapted to enter a groove in which the top or front has movement and having frictional engagement with the said top or front, as and for the purpose set forth.

2. A cabinet consisting of a casing provided with corresponding grooves in the inner faces of its side walls, the upper portions of said grooves being semi-circular, a roll front arranged to slide in said grooves, and a bolt-brake having sliding movement in the casing and adapted to enter one of said grooves wherein the roll front slides, said bolt-brake having a rounded end adapted to engage under and wedge the said roll front against movement in said grooves, substantially as set forth.

PETER ULLRICH.

Witnesses:
FRED D. WILLIAMS,
BILLA F. HOWELL.